L. R. SNAPP.
VEHICLE BODY.
APPLICATION FILED MAR. 26, 1920.

1,380,083.

Patented May 31, 1921.
3 SHEETS—SHEET 1.

INVENTOR.
LEONARD R. SNAPP
BY
Shigley & Harney
ATTORNEYS

L. R. SNAPP.
VEHICLE BODY.
APPLICATION FILED MAR. 26, 1920.
1,380,083.
Patented May 31, 1921.
3 SHEETS—SHEET 2.
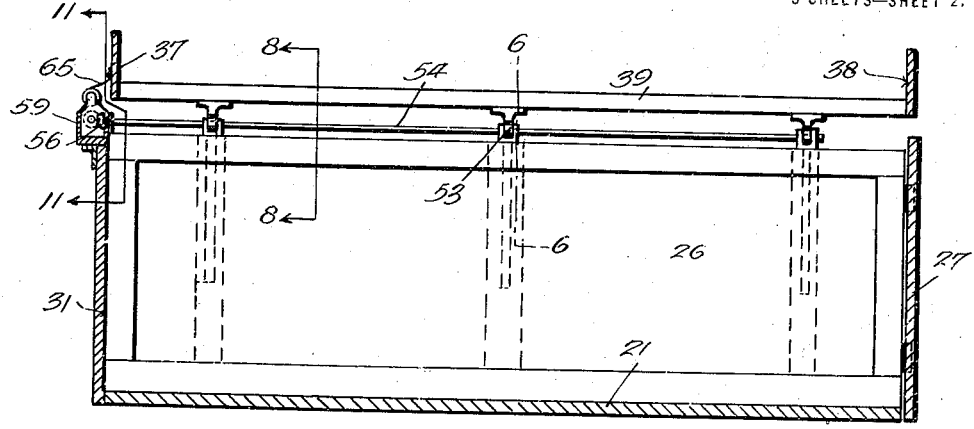
FIG. 4
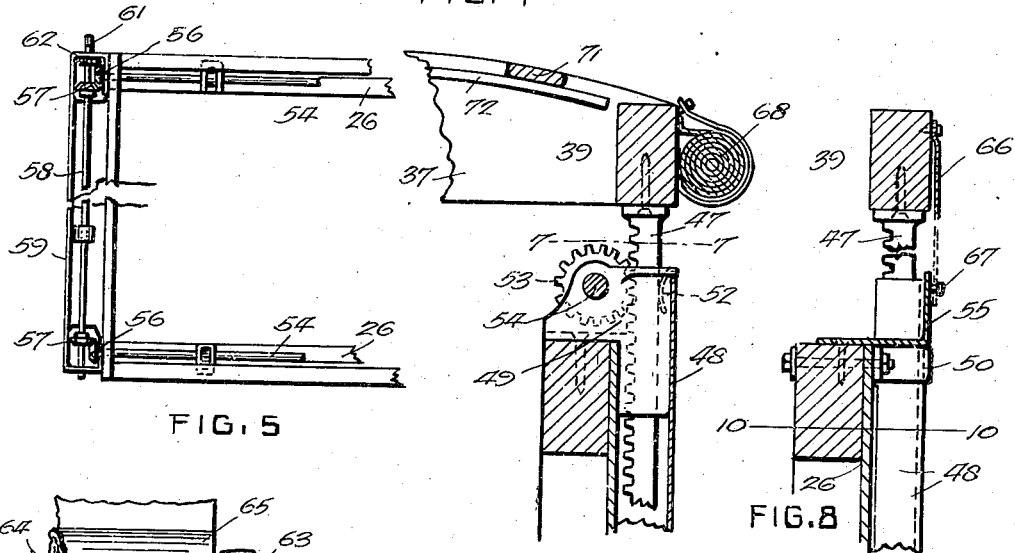
FIG. 5  FIG. 6  FIG. 8
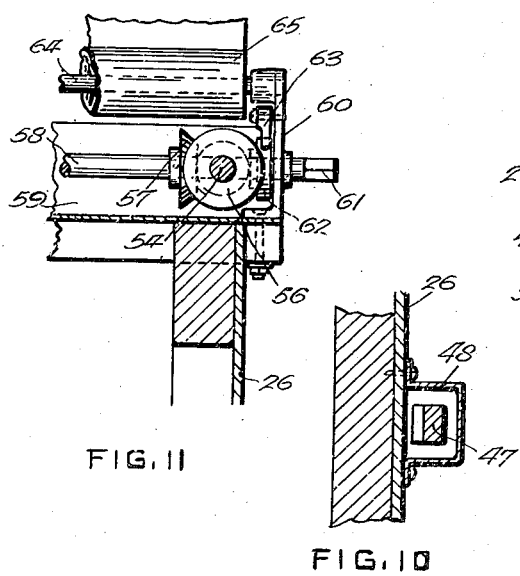
FIG. 11  FIG. 7  FIG. 9
FIG. 10
INVENTOR.
LEONARD R. SNAPP
BY
ATTORNEYS

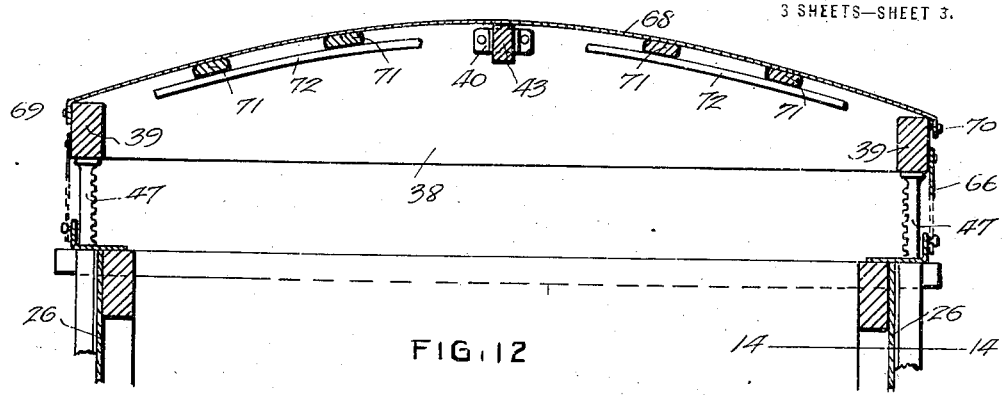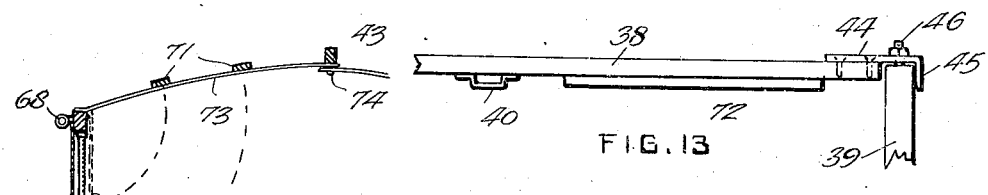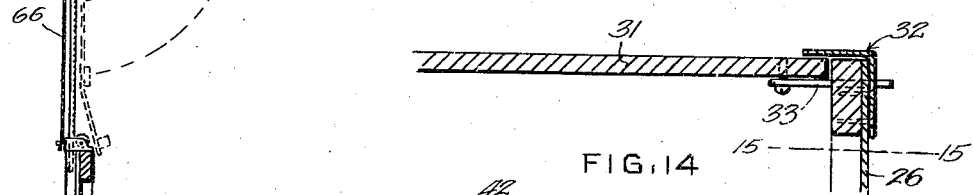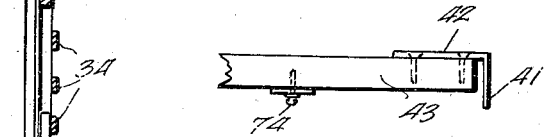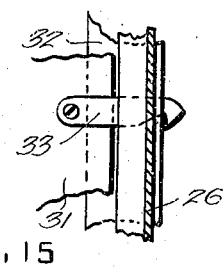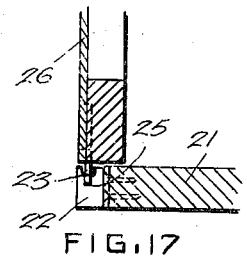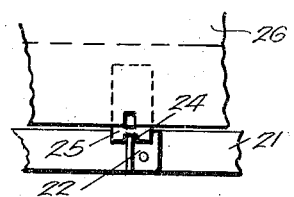

UNITED STATES PATENT OFFICE.

LEONARD R. SNAPP, OF COLUMBUS, OHIO.

VEHICLE-BODY.

1,380,083.  Specification of Letters Patent.  Patented May 31, 1921.

Application filed March 26, 1920. Serial No. 369,132.

*To all whom it may concern:*

Be it known that I, LEONARD R. SNAPP, a citizen of the United States of America, residing at Columbus, in the county of Franklin and State of Ohio, have invented certain new and useful Improvements in Vehicle-Bodies, of which the following is a specification.

My present invention relates to improvements in vehicle bodies designed for use in connection with motor trucks, delivery wagons and other suitable types of vehicles and is more particularly an improvement upon the construction described and claimed in my Patent 1,278,513 of September 10, 1918.

The primary object of the present invention is the provision of certain improvements in a vehicle body readily attachable to and detachable from a vehicle, and including a vertically adjustable top, in the interests of time saving in its adjustment, mounting and demounting, its durability, and its effectiveness and efficiency in use.

To the above end my invention proposes the improved construction which I will describe with respect to the accompanying drawings, forming a part of this specification, and wherein—

Fig. 4 is a vertical longitudinal section through the body,

Fig. 5 is a top plan view of the forward portion of the body,

Figure 1:
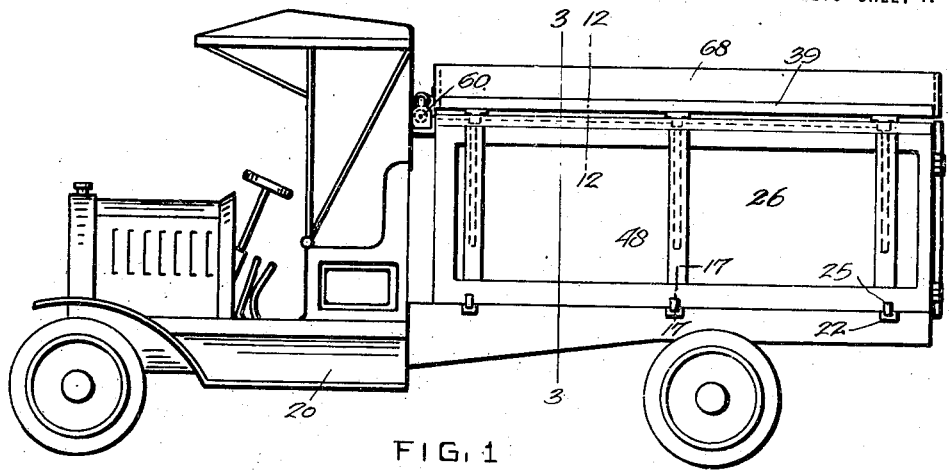
Figure 1 is a side elevation showing my invention complete.

Fig. 6 is a detail vertical section on an enlarged scale taken on line 6—6 of Fig. 4, Fig. 7 is a horizontal section on line 7—7 of Fig. 6, Fig. 8 is a detail vertical section taken on line 8—8 of Fig. 4, Fig. 9 is a top plan view of a portion of the side wall shown in Fig. 8, with the top frame removed, Fig. 10 is a horizontal section taken on line 10—10 of Fig. 8, Fig. 11 is a detail vertical section on line 11—11 of Fig. 4, Fig. 12 is a vertical transverse section through the top and the upper portions of the side walls, Fig. 13 is a top plan view of one corner of the top frame, Fig. 14 is a horizontal section through one forward corner of the side frame of the body, Fig. 15 is a detail vertical section on line 15—15 of Fig. 14, Fig. 16 is a side view of one end of the ridge pole, Fig. 17 is a detail vertical section taken on line 17—17 of Fig. 1, Fig. 18 is a side view of the parts shown in Fig. 17, and Fig. 19 is a vertical section through one side of the body, illustrating certain slight modifications.

Referring now to these figures my invention proposes a vehicle body particularly adapted to automobile trucks and delivery cars of the general nature indicated at 20 in Fig. 1 and having a rear platform shown at 21 whose sides are in accordance with my invention provided at spaced points therealong with rigid angular brackets 22, one of which is particularly shown in Figs. 17 and 18. Each of these brackets has its outstanding portion provided with a recess 23 in its upper edge to coöperate with the lower recessed edge 24 of a lengthwise extending attaching plate 25 carried by the lower edge of one of the body side walls 26, the relatively engaging recessed edges of the plates being thus firmly held in their engaged relation by the weight of the body side walls and the construction being such that each of the side walls may be swung vertically to the effective position in a ready manner by first elevating its lower edge so that its several plates 25 rest upon the brackets 22 of the platform sides.

Figure 2:
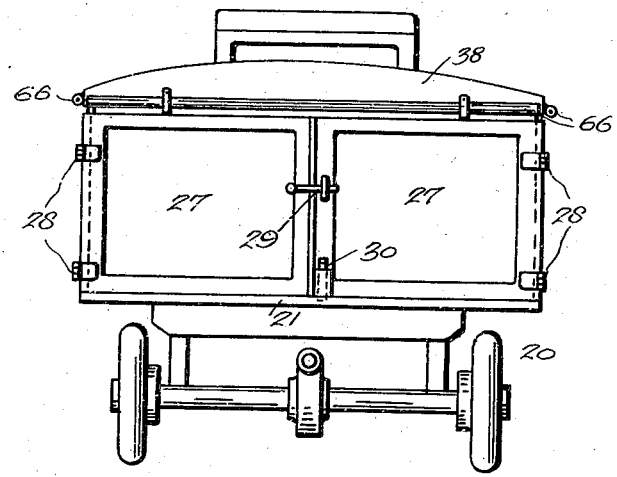
Fig. 2 is a rear elevation.
Figure 3:
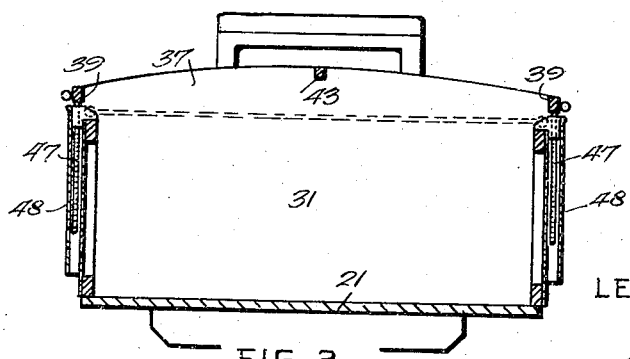
Fig. 3 is a vertical transverse section.

In addition to the side walls 26, the body includes tail gates 27 hinged at 28 to the rear edges of the side walls to swing in horizontal planes to and from the closed position shown in Fig. 2, these tail gates having latching means 29 at their free edges, and one of them has a latch bolt 30 engageable with a suitable keeper opening in the rear portion of the platform 21. The body also includes a front wall 31 whose side edges are engaged along their outer surfaces by the inwardly projecting angular portions of angle bars 32 secured along the forward edges of the side walls 26, and one of which is seen in Figs. 14 and 15. This front wall also has inner gravity latch pieces 33, pivoted thereto, for extension outwardly through forward slots in the side walls and notched to engage portions of the angle bars 32 through openings of which the swinging latch members 33 also extend, so as to thus connect the front wall with the forward edges of the side walls.

The inner surfaces of the side walls may be finished off plain, or may have a series of inner lengthwise side bars 34 as seen in Fig. 19, and in the latter case certain of these side bars will be connected to uprights 35, pivoted at 36 so as to swing inwardly and downwardly to the horizontal position shown in dotted lines in Fig. 19, thus forming side seats within the body.

The top of the body consists of a frame including forward and rear cross bars 37 and 38, and side rails 39, the upper edges of the cross bars 37 and 38 being curved as shown to give the proper crown to the top. Each of the cross bars of the top frame has a bracket 40 centrally of its upper edge to receive the downturned endwise spaced extensions 41 of angular brackets 42 secured to the opposite ends of a ridge pole 43 which latter is thus readily attachable in and removable from the position shown in Fig. 12, a detail of one end of the ridge pole with one of its bracket engaging end pieces being shown in Fig. 16.

Each of the top frame cross bars is also provided with an end bracket 44 at each end, having an endwise offset angular extension 45 to lap the adjacent end of the respective side bar 39, and also apertured to receive a bolt 46 projecting from the said end of the side bar.

At spaced points therealong, the side bars 39 of the top frame have depending vertical rack bars 47 securely fastened at their upper ends thereto and depending within U-shaped casings 48 secured vertically along the outer sides of the body side walls 26 at spaced points, and whose upper ends extend around brackets 49 securely fastened to the upper edges of the side walls and are braced by straps 50 of U-shape, around their upper portions and bolted by bolts 51 to the side walls.

At their inner portions, the brackets 49 have springs 52 bearing against the outer surfaces of the rack bars 47 to hold the inner toothed surfaces of the latter in even uniform engagement with gear wheels 53 secured upon side shafts 54, journaled through the brackets 49 parallel with and above the upper edges of the two side walls, the latter of which may be braced by angle plates 55 therealong between the brackets 49 as seen in Figs. 8 and 9.

As shown particularly in Figs. 4 and 11 the forward ends of the side wall shafts 54 have beveled gears 56 which, when the side and front walls are secured in connection with one another as previously described, come into engagement with similar beveled gears 57 carried by a connecting cross shaft 58 mounted in a channel member 59 carried by the upper edge of the front wall 31, with its opposite ends journaled through end brackets 60 of this channel member. Projecting beyond one of the end brackets 60 as seen in Fig. 11, the connecting shaft has a squared extremity 61 for engagement by a socket handle (not shown) whereby the shaft 58 and consequently the two side wall shafts 54 will be simultaneously rotated to effectively raise and lower the top frame, shaft 58 having a ratchet wheel 62 adjacent to one end bracket 60 as seen in Fig. 11, which bracket has a pawl or dog 63 engaging ratchet wheel 62 so as to thus lock the top frame in elevated position.

The end brackets 60 also preferably form journals for a curtain roller 64 around which a curtain 65 is rolled, the upper edge of which curtain is attached to the forward cross bar 37 of the top frame as seen in Fig. 4 so as to unroll therewith.

Side curtains 66 may be provided for the sides of the body to extend between the top and the upper portions of the side walls, and may be connected to the side bars 39 of the top frame, for detachable connection to buttons 67 of the upper angle plates 55 as seen in Figs. 8 and 9, and the top may be covered by a covering 68 attached to one side bar 39 as seen at 69 in Fig. 12, for extension over the top and detachable connection to buttons 70 upon the other side bar, this top covering being supported by the ridge pole 43 and also if desired by longitudinal slats 71 shown in Fig. 12, supported at their ends upon inwardly projecting ledges 72 of the front and rear cross bars of the top frame. These slats 71 may be individually attachable and removable or the slats at opposite sides of the ridge pole may be carried by flexible webs 73 as seen in Fig. 19 which may be dropped downwardly along the sides as seen in dotted lines and which when raised may be buttoned in lapping relation at their inner portions to buttons 74 along the lower surface of the ridge pole 43.

It is thus obvious that the body may be utilized either covered or uncovered and that when its covering 68 is rolled at one side, the slats 71 and ridge pole 43 are readily removable if desired.

It it also obvious the side walls with their tail gates may be readily placed in position and readily locked in connection with the front wall 31, and the top frame readily placed in position. It is also obvious that this top frame may be readily and effectively elevated as desired and it is thus to be seen that in respect to the features particularly described my invention is a refinement and improvement over the construction shown in my patent previously referred to as well as the structures heretofore proposed for similar purposes.

I claim:

1. The combination with the vehicle platform, of angle plates secured to the sides thereof, and a body including side walls having plates at their lower edges disposed at right angles to portions of the said angle plates, said side wall plates and said angle plates having their said portions recessed for the purpose described.

2. The combination with the vehicle platform, of angle plates secured to the sides thereof having outstanding portions provided with recessed upper edges, and a body including side walls having lower lengthwise plates provided with recessed lower edges to engage the said recessed edges of the angle plates.

3. A vehicle body including side walls having hinged tail gates, and a front wall having swinging side latch pieces, and angle bars having portions secured along the side walls and having portions extending in parallel spaced relation to the front edges of the side walls to receive therebetween the side edges of the front wall, the first named portions of said bars and said side walls being apertured to receive the said latches outwardly therethrough.

4. A vehicle body having side, front and rear walls, and a top including a frame above and adjustable with respect to the walls, a flexible removable covering for the top frame, and removable supports for the said covering, including a ridge pole and slats the latter of which are carried by the flexible covering and the former of which have end hooks, and means carried by the top frame to support the ends of the slats and receive the ridge pole hooks.

5. A vehicle body having surrounding walls, and a top including a frame above and vertically adjustable with respect to the walls, a flexible removable covering for said top frame, and removable covering supports, including a ridge pole having end hooks, said top frame having end bars provided with brackets to receive the hooks of the ridge pole as described.

6. A vehicle body including side and end walls, vertical casings along and extending outwardly beyond the side walls, brackets at the upper ends of said casings seated on the upper edges of the side walls, shafts journaled lengthwise along and above the upper edges of the side walls in the said brackets, gears on the shafts within the brackets, a top frame having depending rack bars extending into the casings through the said brackets and provided with inner rack faces engaging the said gears, and a cross shaft journaled along one of the end walls, having geared connections with the adjacent ends of the shafts of the side walls and also having a wrench engaging end, and ratchet means to prevent rotation of the latter shaft in one direction, said brackets of said side walls having springs engaging outer smooth faces of the rack bars of the top frame to hold the latter in even uniform engagement with the gears of the side wall shafts as described.

In testimony whereof I have affixed my signature.

LEONARD R. SNAPP.